US012612950B2

(12) United States Patent
Shahin et al.

(10) Patent No.: US 12,612,950 B2
(45) Date of Patent: Apr. 28, 2026

(54) BRAKE PAD FOR A DISK BRAKE SYSTEM AND DISK BRAKE SYSTEM

(71) Applicant: HL MANDO CORPORATION, Pyeongtaek-si (KR)

(72) Inventors: Hatem Shahin, Pfaffenhofen (DE); Lothar Wagner, Simmern (DE); Kai Braun, Friedrichsdorf (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 379 days.

(21) Appl. No.: 18/198,563

(22) Filed: May 17, 2023

(65) Prior Publication Data

US 2023/0375055 A1      Nov. 23, 2023

(30) Foreign Application Priority Data

May 18, 2022    (DE) .......................... 102022204974.8

(51) Int. Cl.
F16D 65/092 (2006.01)
B32B 3/04 (2006.01)
(Continued)

(52) U.S. Cl.
CPC .............. F16D 65/092 (2013.01); B32B 3/04 (2013.01); B32B 3/30 (2013.01); B32B 15/18 (2013.01);
(Continued)

(58) Field of Classification Search
CPC ................. F16D 65/092; F16D 65/095; F16D 2200/0004; F16D 2200/0026; B32B 3/04; B32B 3/30; B32B 15/20; B32B 2307/744; B32B 2264/1055; B32B 15/18; B32B 2475/00

See application file for complete search history.

(56) References Cited

U.S. PATENT DOCUMENTS 9,291,226 B2 *    3/2016    Jaeger ................... F16D 65/092
2007/0227841 A1    10/2007    Hara et al.
(Continued)

FOREIGN PATENT DOCUMENTS

DE            2262772 C2      6/1982
DE            19706122 A1      8/1998
(Continued)

OTHER PUBLICATIONS

German Patent No. DE 102018208179 to Shahin published on Nov. 28, 2019.*

(Continued)

*Primary Examiner* — Pamela Rodriguez
(74) *Attorney, Agent, or Firm* — LEE, HONG, DEGERMAN, KANG & WAIMEY

(57) ABSTRACT

The application relates to a brake pad for a disk brake system and to a disk brake system. The proposed brake pad comprises a back plate having a front side for facing a brake disk of the disk brake system and a friction layer arranged on the front side of the back plate for contacting a friction surface of the brake disk. The brake pad further comprises an underlayer arranged between the front side of the back plate and the friction layer. The back plate comprises a recess. The underlayer extends into the recess of the back plate.

12 Claims, 12 Drawing Sheets

(51) Int. Cl.
B32B 3/30 (2006.01)
B32B 15/18 (2006.01)
B32B 15/20 (2006.01)

(52) U.S. Cl.
CPC ....... *B32B 15/20* (2013.01); *B32B 2264/1055*
(2020.08); *B32B 2307/744* (2013.01); *B32B*
*2475/00* (2013.01); *F16D 2200/0004*
(2013.01); *F16D 2200/0026* (2013.01)

(56) References Cited

U.S. PATENT DOCUMENTS

| | | | | |
|---|---|---|---|---|
| 2017/0152904 A1* | 6/2017 | Lee | ..................... | F16D 65/0006 |
| 2020/0018369 A1 | 1/2020 | Werder et al. | | |

FOREIGN PATENT DOCUMENTS

| | | |
|---|---|---|
| DE | 69610546 T2 | 5/2001 |
| DE | 10123004 C1 | 10/2002 |
| DE | 102013002588 A1 | 8/2014 |
| JP | 2012-211675 A | 11/2012 |
| JP | 6893529 B2 | 6/2021 |

OTHER PUBLICATIONS

Translation of the description section of Japanese Patent No. JP 2012211675 obtained from website: https://worldwide.espacenet. com on Jul. 28, 2025.*
Translation of the description section of German Patent No. DE 10123004 obtained from website: https://worldwide.espacenet.com on Jul. 28, 2025.*
Office Action issued in corresponding German Patent Application No. 10 2022 204 974.8 dated Mar. 27, 2023.

* cited by examiner

BRAKE PAD FOR A DISK BRAKE SYSTEM AND DISK BRAKE SYSTEM

CROSS-REFERENCE TO RELATED APPLICATION

This application is based on and claims priority under 35 U.S.C. § 119 to German Patent Application No. 102022204974.8, filed on May 18, 2022 in the German Patent and Trade Mark Office, the disclosures of which are incorporated herein by reference.

TECHNICAL FIELD

The application relates to a brake pad for a disk brake system and to a disk brake system.

BACKGROUND

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, an underlayer connecting the friction material to the back plate, and additional massive bodies on certain components like a carrier or the housing. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1.

SUMMARY

In view of the above-mentioned aspects, it is an object of the present application to provide an improved brake pad for a disk brake system. In particular, it is an object of the application to provide a compact and robust brake pad with a low mass at a low cost, which reliably suppresses noise, in particular squeal noise. In addition, it is an object of the application to provide an improved disk brake system having these advantages.

This objective is achieved by a brake pad for a disk brake system comprising the features of claim 1 and by a disk brake system having the features of another claim. Optional further features and further developments will become apparent from the dependent claims and the detailed description in conjunction with the accompanying figures.

The proposed brake pad for a disk brake system comprises a back plate having a front side for facing a brake disk of the disk brake system and a friction layer arranged on the front side of the back plate for contacting a friction surface of the brake disk. The brake pad further comprises an underlayer arranged between the front side of the back plate and the friction layer. The back plate comprises a recess, in particular on its front side. The underlayer extends into the recess of the back plate. In some embodiments, the underlayer essentially completely fills out the recess of the back plate. The underlayer typically comprises a portion that is arranged between the back plate and the friction layer.

Further, the underlayer typically comprises a portion that is arranged within a structure of the back plate.

By providing the underlayer that extends into the recess of the back plate, material damping and a dynamic behaviour of the brake pad may be improved. The underlayer that extends into the recess of the back plate improves material, structural, and interface damping within the brake pad. Thereby, the generation of noise, in particular squeal noise, may be efficiently suppressed. Providing the underlayer within the recess of the back plate has the advantage that noise is efficiently dampened in a region that is close to the friction surfaces of the brake disk and the friction material. In general, brake pads are components that strongly contribute to noise transmission from the source of vibration (relative motion between brake disk and friction layer) to other components of the disk brake system, e.g., brake or axle parts. Because the back plate and the underlayer are arranged between the source of vibration and the other components, it is beneficial to improve damping of vibrations by providing the underlayer within the recess of the back plate. The underlayer within the recess of the back plate is suitable to efficiently disturb the path of noise transmission in the back plate region and to increase material as well as structure damping of the brake pad. The proposed brake pad therefore enables efficient noise reduction at low cost and with a low mass. Further, due to the efficient noise reduction properties of the underlayer within the recess of the back plate, an additional damping means such as a shim and/or chamfer may not be required in some embodiments, leading to a further simplification of the design and to a reduction in size and weight. The beneficial noise characteristics of the proposed brake pad may be achieved over a wide range of frequencies and may be essentially independent of temperature.

The application further relates to the disk brake system. The disk brake system may comprise a brake pad as described above or below. The disk brake system may further comprise a carrier. The brake pad may be configured to slide with respect to the carrier. The brake pad may be configured to slide with respect to the carrier in an axial direction upon brake application. The axial direction may be parallel to an axis of rotation of the brake disk. In most embodiments, the disk brake system is a floating caliper brake. The disk brake system may comprise a brake piston and/or a caliper finger. The brake piston or caliper finger may be configured to push against a back side of the brake pad to push the friction layer of the brake pad against the friction surface of the brake disk.

The back side of the brake pad may be formed by a back surface of the back plate.

For efficient noise dampening, the portion of the underlayer that is arranged between the back plate and the friction layer may have a thickness of at least 1 mm and/or at most 4 mm. The portion of the underlayer that is arranged between the back plate and the friction layer typically forms a layer. The portion of the underlayer that is arranged within a structure of the back plate typically extends from the back side of the portion of the underlayer that is arranged between the back plate and the friction layer. The portion of the underlayer that is arranged between the back plate and the friction layer and the portion of the underlayer that is arranged within a structure of the back plate are typically integrally formed as a non-joined one-piece part and/or formed by a monolithic body. The portion of the underlayer that is arranged between the back plate and the friction layer and the portion of the underlayer that is arranged within a structure of the back plate typically have the same material properties, e.g., be formed by the same material and/or have the same density.

The back plate may comprise a metallic portion. The metallic portion may be, e.g., a steel portion, a cast iron portion or an aluminium portion. Thereby, the noise damping characteristics of the brake pad may be further improved. An interface may be formed between the metallic portion and the portion of the underlayer that is arranged within the structure of the back plate. Providing the metallic portion as well as the portion of the underlayer that is arranged within the structure of the back plate may lead to improved material and structure damping and thereby to a reduction of noise amplitude, while improving a structural stability of the back plate. Having the portion of the underlayer that is arranged within the structure of the back plate as well as the metallic portion enables design options, in which portion of the underlayer that is arranged within the structure of the back plate and the metallic portion are arranged such that the noise dampening and stability properties of the brake pad are optimized in view of the strain and deflection characteristics of the back plate, e.g., based on calculation. For example, the portion of the underlayer that is arranged within the structure of the back plate may be arranged in a region of the back plate that is subjected to lower stress in realistic braking scenarios, and the metallic portion may be arranged in a region of higher stress. Further, an underlayer material and underlayer arrangement within the structure of the back plate may be designed to adjust the eigenfrequencies of the back plate or the brake pad in a manner to prevent frequency coupling and thereby improve NVH behaviour.

In further embodiments, the back plate comprises another metallic portion. The underlayer may be arranged between the metallic portion and the other metallic portion. In this way, the noise reduction characteristics may be further improved by increasing the interface damping effect, while ensuring a particularly robust design of the back plate. In some embodiments, there is no direct contact between the back plate and the friction layer, as the underlayer is arranged between the back plate and the friction layer. The friction layer typically does not have a portion that is arranged within the structure of the back plate.

Typically, an E modulus and/or a G modulus of the underlayer is smaller than that of the metallic portion of the back plate. Further, an E modulus and/or a G modulus of the underlayer may be smaller than that of the friction layer. Suitable materials for the underlayer are generally known in the art. For example, the underlayer may be a composite material having multiple constituents. The underlayer may ensure good bonding strength with the back plate, dampen vibration and noise generated in the braking system, and provide a thermal and moisture barrier. The underlayer may, e.g., comprise rubber, adhesive, phenolic resin, Ba sulphide, friction powder, graphite, Zirconium oxide, and/or fibers, in particular Aramid fibers. To further improve the noise damping properties of the back plate, the underlayer may contain copper, e.g., copper particles. Thereby, the material damping properties may be further improved. Particularly advantageous properties may be achieved by an underlayer containing at least 5 percent, in particular at least 10 percent, and/or at most 20 percent copper by weight. The underlayer typically has an anisotropic E modulus. For improved noise reduction, a value of the E modulus in the radial direction (z), $E_{zz}$, may be at least 2500 and/or at most 7500 MPa. In the tangential and radial directions, the values of the E modulus (i.e., $E_{xx}$ and $E_{yy}$) may be at least 12000 and/or at most 18000 MPa. The G modulus may also be anisotropic, with $G_{xz}$ and $G_{yz}$ being at least 1800 and/or at most 6800 MPa. $G_{xy}$ may be at least 4000 and/or at most 9500 MPa. A density of the underlayer may be at least 2 and/or at most 2.5 $g/cm^3$.

The application may further relate to a method for fabricating a brake pad. The brake pad may have any or all of the features described below. In a method step, the back plate having the recess on its front side may be formed. In another step, the underlayer may be formed such that it extends into the recess of the back plate. In another step, the friction layer may be added, such that the underlayer is arranged between the front side of the back plate and the friction layer. The method of fabricating the brake pad may be a shell construction process. Additionally or alternatively, portions of the back plate, in particular the metallic portions, may be connected together using an edge welding process. In some embodiments, the back plate may be produced by additive manufacturing, e.g., laser sintering and/or 3D printing.

In typical embodiments, the back plate comprises a guiding protrusion. The guiding protrusion may be configured to be slidably received within a guiding recess of a carrier of the disk brake system. In some embodiments, the underlayer is in part arranged in the guiding protrusion. Thereby, noise may be further reduced, as the material damping properties and friction properties are improved in a region of the brake pad that is highly relevant for noise transmission between the brake pad and the carrier and that is further highly relevant for the sliding properties of the back plate relative to the carrier and noise generated therewith.

In typical embodiments, the back plate comprises a back plate body. The guiding protrusion of the back plate may protrude in a tangential direction from the back plate body. In this manner, the guiding protrusion may extend in a sideward direction and may define a leading or a trailing portion of the back plate or a part thereof. The back plate may comprise another guiding protrusion. The guiding protrusion may define a leading portion of the back plate, and the other guiding protrusion may define a trailing portion of the back plate. In some embodiments, the underlayer may in part be arranged in the other guiding protrusion of the back plate.

In some embodiments, the underlayer extends to the back surface of the back plate. For example, a portion of the underlayer may form a part of the back side of the brake pad. The underlayer may be visible as viewed from a back side of brake pad. Thereby, the friction properties of the back side of the brake pad may be improved. Also, the interface dampening, material damping and structural damping properties may be improved in a region that is configured to be pushed on by the caliper finger or by the brake piston. Hence, noise generation can be further reduced. For example, the brake pad may comprise a pressure region that is configured to be pushed on by the brake piston or by the caliper finger of the disk brake system. The underlayer may at least in part be arranged within the pressure region. In particular, the portion of the underlayer that is arranged within the structure of the back plate and/or the portion of the underlayer that forms a part of the back side of the brake pad may be arranged within the pressure region. Thereby, a friction contact and mode decoupling may be improved and noise may be further suppressed. In some embodiments, the underlayer extends from the front side of the back plate to a back surface of the back plate. In this way, it may be ensured that vibrational modes are effectively dampened in the structure of the back plate as well as at the interfaces between the back plate structure and an adjacent part of the disk brake system. In some examples, the portion of the underlayer that forms a part of the back side of the brake pad may be flush with a back surface of the back plate. For example, an opening may be formed on the back surface of the back plate. The underlayer may extend into the opening formed on the back surface of the back plate. In further embodiments, the underlayer may extend beyond the back surface of the back plate. A portion of the underlayer may further cover the back surface of the back plate. The portion of the underlayer may form a layer arranged on the back surface of the back plate. In this manner, friction properties and noise transmission properties of the back side of the brake pad may be further improved.

The back plate may be filled with the underlayer. In some embodiments, the recess of the back plate comprises a cavity. The underlayer may extend into the cavity. The cavity may be formed within the metallic portion. Thereby, it is ensured that the underlayer is reliably embedded within the structure of the back plate for improved noise reduction. The underlayer may essentially fully fill out the cavity. For example, the back plate and the underlayer may be in an interlocking arrangement. In some embodiments, the back plate comprises a through hole connecting the cavity with the front side of back plate. The underlayer may extend through the through hole and into the cavity. The underlayer may have a narrower portion arranged within the through hole and a wider portion embedded in the cavity.

In typical embodiments, the portion of the underlayer that is arranged within the structure of the back plate forms or is a layer. Also, the metallic portion or metallic portions of the back plate may form a layer or layers. Typically, for efficient noise reduction, a size of the portion of the underlayer that is arranged within the structure of the back plate has a width and height, e.g., as measured in the tangential and radial direction, respectively, of at least 20 mm, in particular at least 50 mm, and/or at most 200 mm. The portion of the underlayer that is arranged within the structure of the back plate or a part thereof may be wider than it is thick. In particular, a thickness of the portion of the underlayer that is arranged within the structure of the back plate may be at least 2 mm, in particular at least 3 mm, e.g., as measured in the axial direction. A thickness of the back plate and/or the guiding protrusion of the back plate may be at least 3 mm and/or at most 8 mm, for example 5 mm, in particular as measured in the axial direction. Correspondingly, a size of the cavity of the back plate has a width and height of at least 20 mm, in particular at least 50 mm, and/or at most 200 mm for efficient noise damping.

The disk brake system may comprise another brake pad having any or all of the features of the brake pad described above or below. The brake pad may be configured to be pushed on by the caliper finger, while the other brake pad may be configured to be pushed on by the brake piston. The brake pad and the other brake pad may differ in size/or shape, according to some embodiments.

Features described above or below with regard to the back plate or the disk brake system may be correspondingly applied to the method for fabricating disk brake system and vice versa.

BRIEF DESCRIPTION OF DRAWINGS

Exemplary embodiments will be described in conjunction with the following figures.

6

Figure 4:
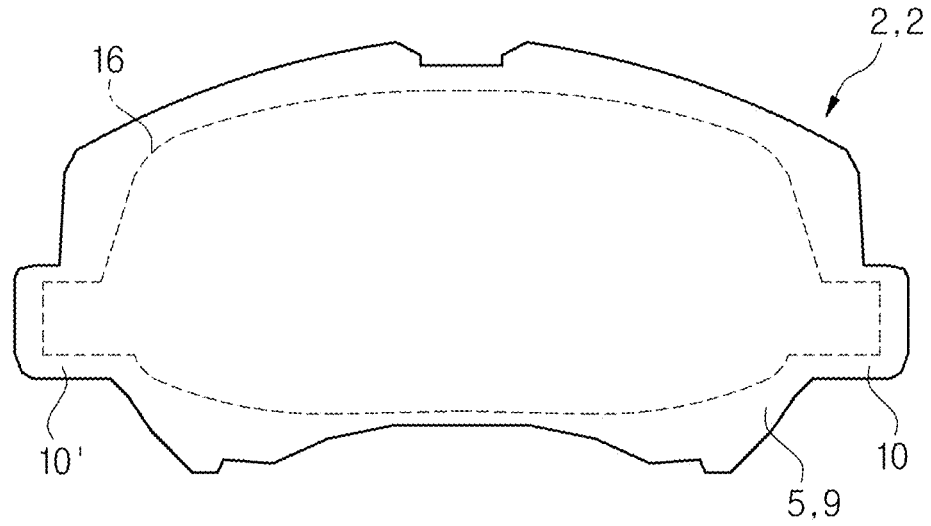
Figure 5:
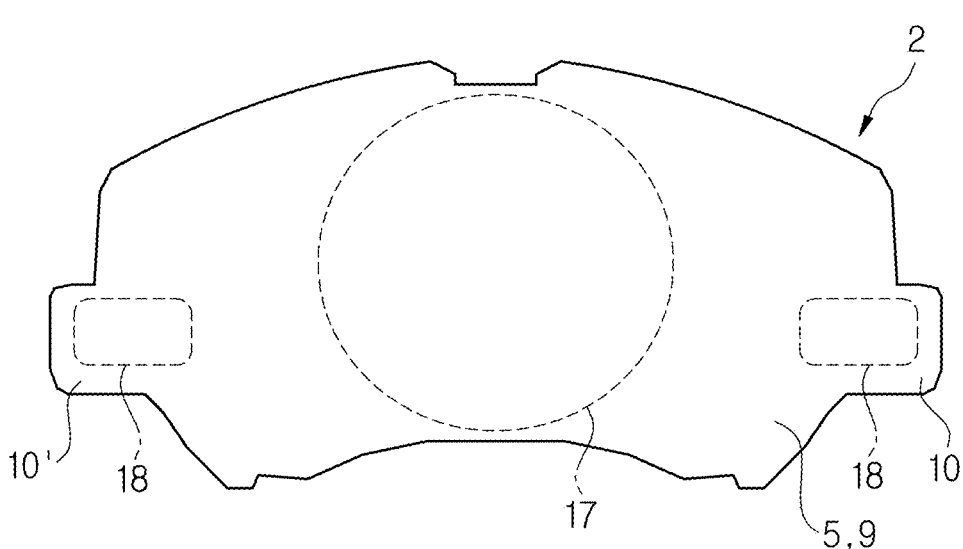
Figure 6:
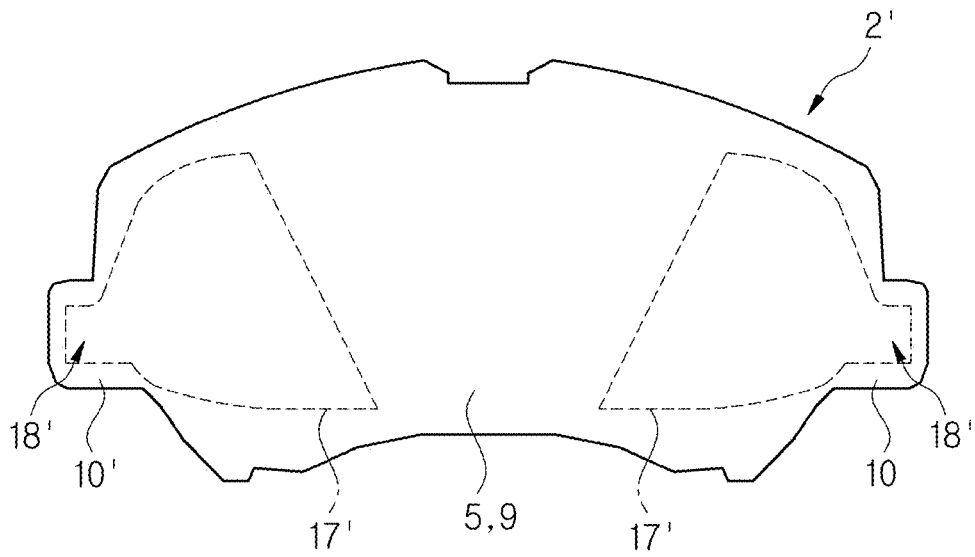
Figure 7:
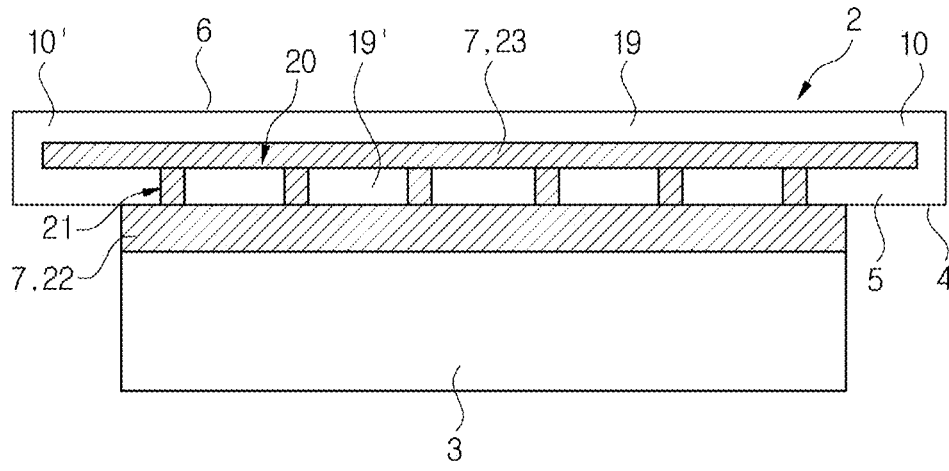
Figure 8:
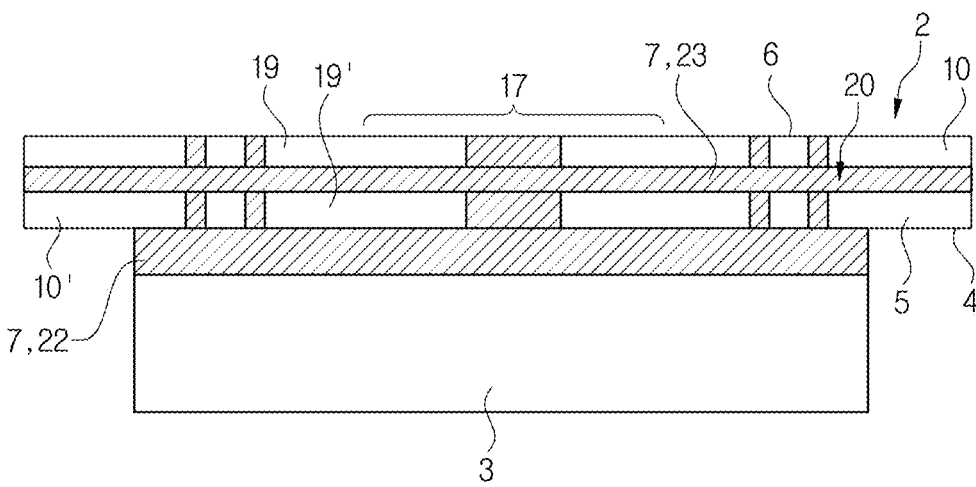
Figure 9:
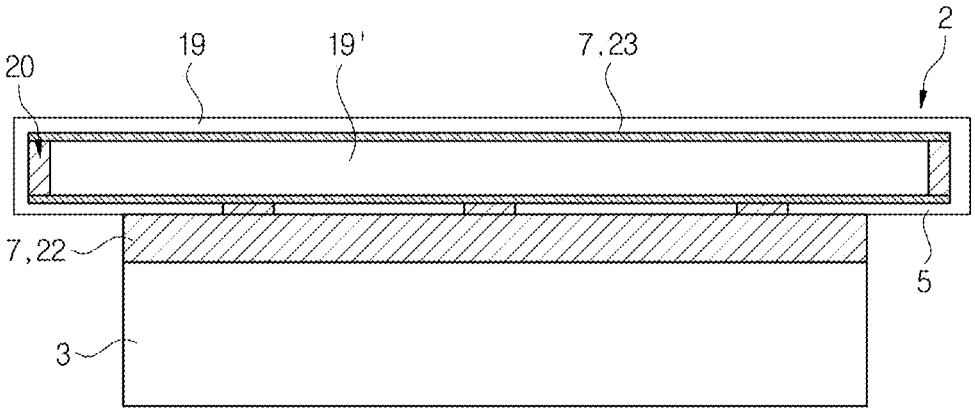
Figure 10:
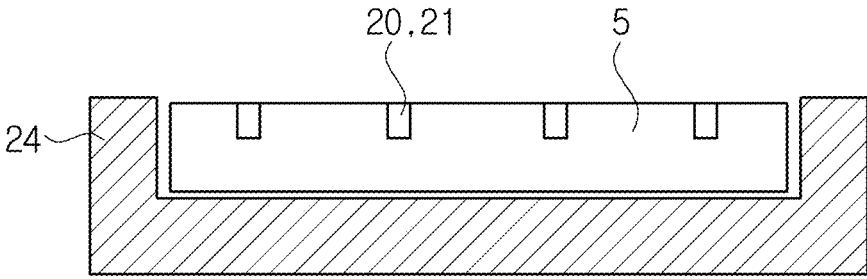
Figure 11:
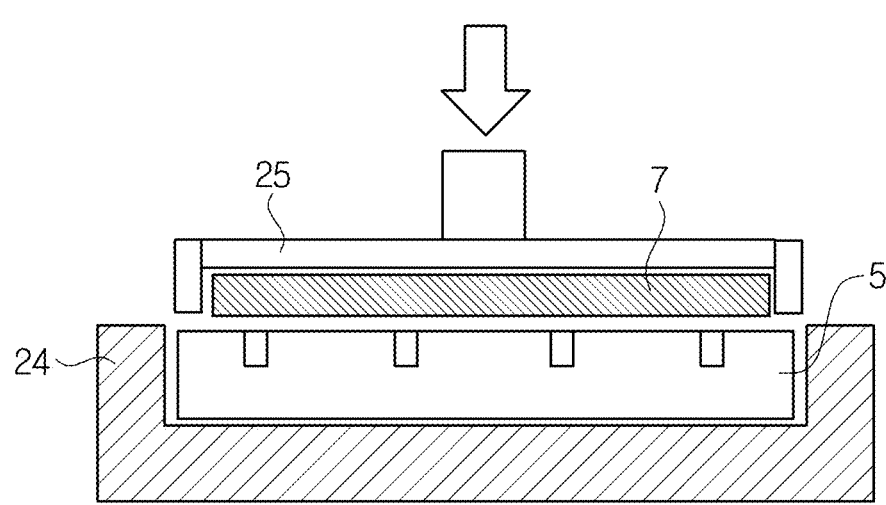
Figure 12:
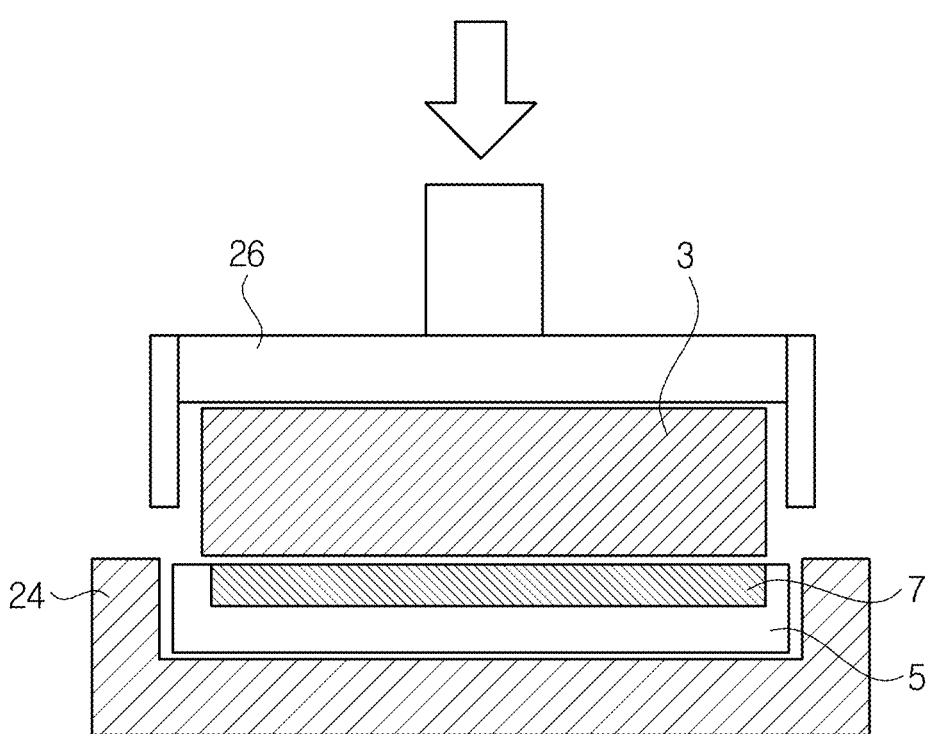

FIGS. 4 to 6 show schematic illustrations of brake pads according to different embodiments,
FIGS. 7 to 9 show schematic cross-sectional illustrations of brake pads according to different embodiments, and
FIGS. 10 to 12 schematically illustrate a method for fabricating the brake pad.

DETAILED DESCRIPTION

Figure 1:
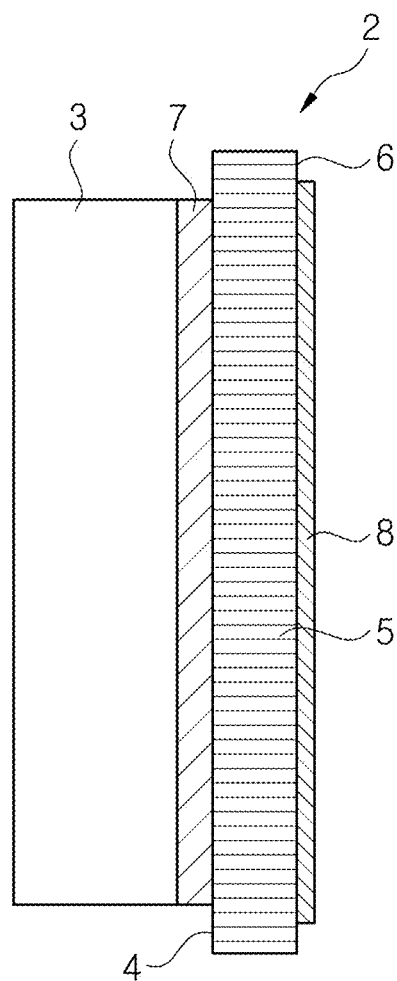
FIG. 1 shows a schematic view of a brake pad.

FIG. 1 shows a schematic view of a brake pad of a disk brake system of a vehicle. The disk brake system comprises a brake disk 1 (illustrated in FIG. 3) as well as a brake pad 2. The brake pad 2 has a friction layer 3, which is pushed against a friction surface of the brake disk 1 upon actuation of the disk brake system, e.g., hydraulic or electric actuation. The friction layer 3 contains a material that shows a good stopping performance and heat transfer when engaging with the brake disk 1. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fibre. These materials show good stopping performance and heat transfer when engaging with the brake disk. The friction layer 3 is indirectly connected with a front side 4 of a back plate 5, which provides structural stability to the brake pad 2. A brake piston or a caliper finger of the disk brake system is configured to push against a back surface 6 of the back plate 5 to push the friction layer 3 against the brake disk 1. An underlayer 7 is arranged between the front side 4 of the back plate 5 and the friction layer with an illustrated portion of the underlayer. As discussed below, the underlayer 7 further has a portion that is arranged within a structure of the back plate 5.

Figure 2:
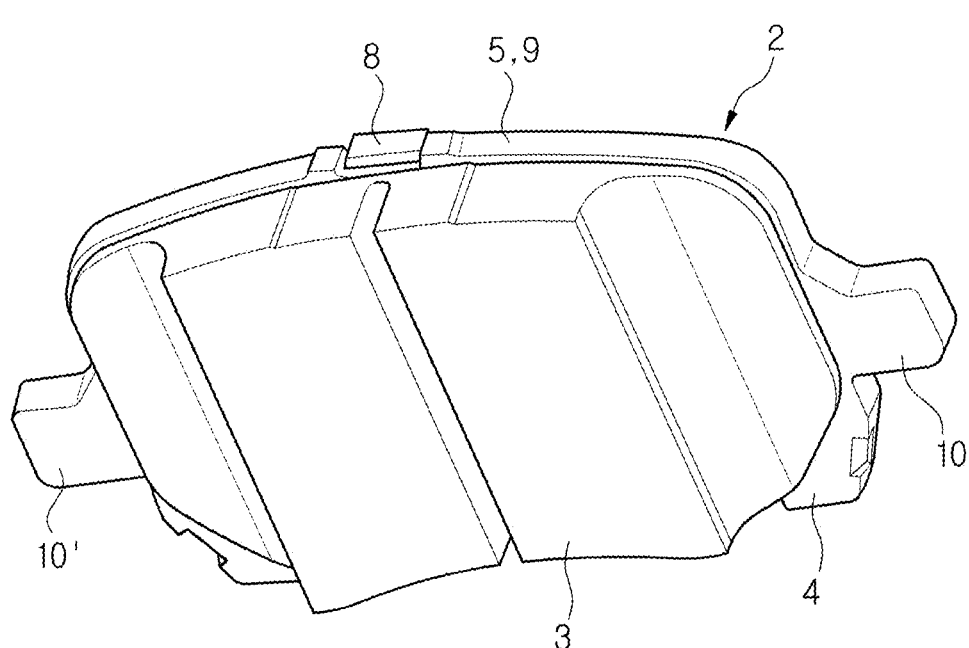
FIG. 2 shows a perspective view of the brake pad.

FIG. 2 shows a perspective view of the brake pad 2. Corresponding and reoccurring features shown in the different figures are denoted using the same reference numerals. The friction layer 3 of the brake pad 2 is fixed to the front side 4 of the back plate 5 via the underlayer 7. Although the underlayer 7 is not shown in the figure, it is provided in all embodiments of the invention. A clip-on-shim 8 may be attached to the back surface 6 of the back plate 5 for noise dampening in some embodiments. However, due to the beneficial noise damping properties of the underlayer within the structure of the back plate 5, a shim 8 may not be required in some embodiments. The back plate 5 comprises a back plate body 9 forming the main portion of the back plate 5 and carrying a portion of the underlayer 7 together with the friction layer 3. The underlayer 7 may be glued to the front side 4 or attached to the back plate 5 by other means. The back plate 5 further comprises a pair of guiding protrusions 10, 10' formed at the two tangential sides of the back plate and each configured to be received within a respective guiding recess of a carrier of the disk brake system. A thickness of the back plate 5 may be, e.g., 5 mm.

Figure 3:
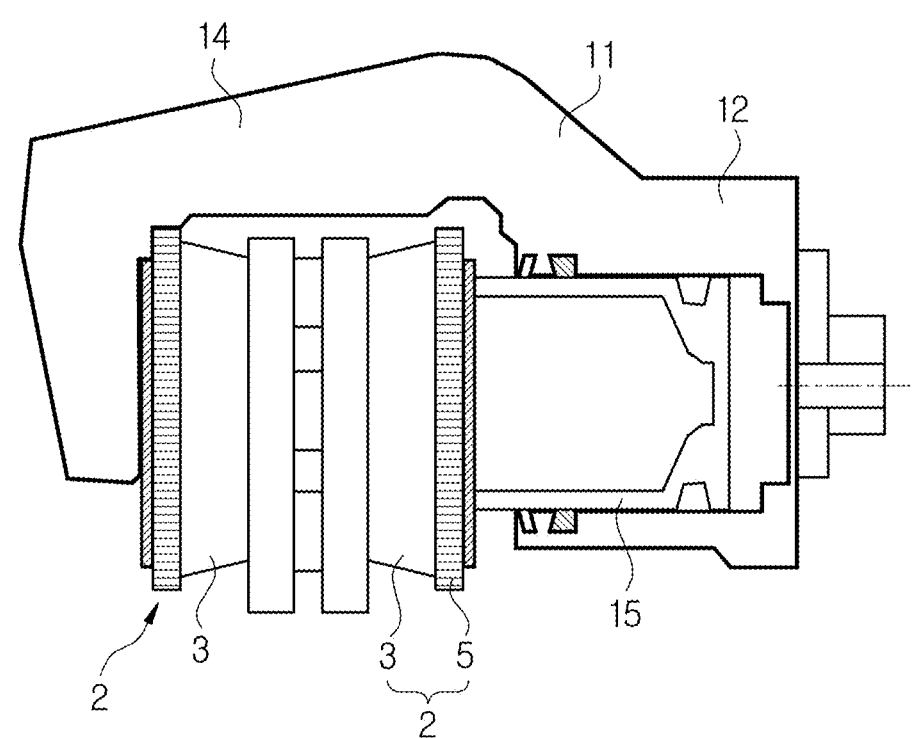
FIG. 3 shows a schematic cross-sectional illustration of a disk brake system.

FIG. 3 illustrates the disk brake system for a vehicle. The disk brake system includes the brake disk 1 as well as a caliper housing 11. The caliper housing 11 has an inner part 12, an outer part 13, and a bridge part 14 connecting the inner part 12 with the outer part 13. A brake piston 15 is received inside a cavity formed within the inner part 12. The cavity in the inner part 12 may be in fluid communication with a master cylinder of the disk brake system for hydraulic actuation of the disk brake system. The outer part 13 of the caliper housing 11 may be referred to as a caliper finger. The disk brake system further comprises a pair of brake pads 2, 2'. Upon application of the brake, the caliper finger 13 and the brake piston 15 push the brake pads 2, 2' in an axial direction toward one another and toward the brake disk 1. The brake pads 2, 2' each have a friction layer 3, 3', which is pushed against a friction surface of the brake disk 1 upon actuation of the disk brake system. The brake piston 15 or the outer part 13 of the caliper housing 11 are configured to push against back sides of the brake pads 2, 2' to push the friction layers 3, 3' against the brake disk 1.

FIG. 4 shows a schematic view of one of the pair of brake pads 2, 2' as viewed from its back side. As mentioned, the underlayer has a portion that is arranged within a structure of the back plate 5. A dotted line 16 indicates a preferred position of the underlayer 7 within the structure of the back plate 5. The portion of the underlayer 7 may be received within a recess of the back plate such that the underlayer 7 is not only arranged between the front side 4 of the back plate 5 and the friction layer 3, but also extends into the structure of the back plate 8 in the region of the body portion 9 of the back plate 5 and also extends into the guiding protrusions 10, 10' of the back plate 5.

FIGS. 5 and 6 illustrate preferred locations within the structure of the back plate 5 that may be filled with the underlayer 7 for the inner brake pad 2 and the outer brake pad 2', respectively. The underlayer 7 extends into the recess of the back plate 5 preferably at least in a part of a pressure region 17, 17' of the brake pad 2, 2'. The pressure region 17, 17' is defined by the region or regions of the back side of the brake pad 2, 2' that is configured to be pushed on by the brake piston 15 or by the caliper finger 13 upon application of the disk brake system. For the inner brake pad 2, the pressure region 17 is roughly circular due to the circular shape of the brake piston 15. For the outer brake pad 2', the pressure region 17' may be formed by two separate regions defined by a region that is being pushed by the caliper finger 13 having a two-finger design as known in the art. In addition, the inner and outer brake pads 2, 2' each have an underlayer 7 extending into the guiding protrusions 10, 10' of the back plate 5, as indicated by the dashed lines with reference numeral 18 and the arrows with reference numeral 18'.

FIGS. 7 to 9 show schematic cross-sectional illustrations of brake pads 2 according to different embodiments. The back plate 5 may be formed by different metallic portions 19, 19'. The metallic portions 19, 19' of the back plate 5 are formed in such a manner that a cavity 20 is formed within the back plate 5. The cavity 20 is in communication with the front side 4 of the back plate 5 via a plurality of through holes 21.

The cavity 20 and the through holes 21 form the recess of the back plate 5. The underlayer 7 is formed as a monolithic and homogeneous one-piece part and comprises a portion 22 that is arranged between the front side 4 of the back plate 5 and the friction layer 3 and another portion 23 that extends into a structure of the back plate 5 through the through holes 21 and into the cavity 20. According to the embodiment depicted in FIG. 8, the portion of the underlayer 7 that is arranged within the structure of the back plate 5 forms a continuous layer that extends through the entire structure of the back plate 5 from a leading edge that is formed by an outer edge of the leading guiding protrusion 10 to a trailing edge that is formed by an outer edge of the trailing guiding protrusion 10'. Further, the portion of the underlayer 7 that is arranged within the structure of the back plate 5 extends from the front side 4 of the back plate to the back surface 6 of the back plate 5. The underlayer 7 may be visible as viewed from a back side of the brake pad 2, and the underlayer may in some embodiments by flush with the back surface 6 of the back plate 5 (as illustrated) or cover the back surface 6 of the back plate 5 in further embodiments. The underlayer is arranged in the pressure region 17, 17' that is configured to be pushed upon by the brake piston 15 or by the caliper finger 13, and the underlayer 7 extends toward the back surface 6 of the back plate 5 in the pressure region 17, 17'. According to the embodiment of FIG. 9, the portion 23 of the underlayer 7 that is arranged within the structure of the back plate 5 completely encircles one of the metallic portions 19' of the back plate 5 such that the metallic portion 19' is embedded in the portion of the underlayer 7.

FIGS. 10 to 12 schematically illustrate a method of manufacturing the back plate 2. First, the back plate 5 having the metallic portions 19, 19' and the schematically illustrated recess 20, 21 may be formed, e.g., inside a molding tool 24. Afterwards, the underlayer 7 may be placed within or filled into the recess 20, 21 of the back plate 5, e.g., using a pressing tool 25, thereby forming the portion 23 of the underlayer 7 that is arranged within the structure of the back plate 5 and the portion 22 of the underlayer 7 that is intended to be arranged between the front side 4 of the back plate 5 and the friction layer 3. In a next step, another pressing tool 26 may be used to attach the friction layer 3 to the underlayer 7 and thereby form the brake pad 2.

Features of the different embodiments which are merely disclosed in the exemplary embodiments may be combined with one another and may also be claimed individually.

What is claimed is:

1. A brake pad for a disk brake system, comprising
   a back plate having a front side for facing a brake disk of the disk brake system,
   a friction layer arranged on the front side of the back plate for contacting a friction surface of the brake disk,
   an underlayer arranged between the front side of the back plate and the friction layer,
   wherein the back plate comprises a recess,
   wherein the recess of the back plate comprises a cavity, and a plurality of through holes connecting the cavity with the front side of the back plate, and
   wherein the underlayer extends through the plurality of through holes and into the cavity.

2. The brake pad of claim 1, wherein the back plate comprises a guiding protrusion configured to be slidably received within a guiding recess of a carrier of the disk brake system, wherein the underlayer is in part arranged in the guiding protrusion.

3. The brake pad of claim 1, wherein the underlayer extends to a back surface of the back plate.

4. The brake pad of claim 3, further comprising:
   a pressure region that is configured to be pushed on by a brake piston or by a caliper finger of the disk brake system, wherein the underlayer is at least in part arranged within the pressure region.

5. The brake pad of claim 1, wherein the back plate comprises a metallic portion and another metallic portion, wherein the underlayer is arranged between the metallic portion and the other metallic portion.

6. The brake pad of claim 1, wherein the underlayer has a portion that is arranged within a structure of the back plate, wherein the portion of the underlayer that is arranged within the structure of the back plate forms a layer.

7. The brake pad of claim 1, wherein an E modulus and/or a G modulus of the underlayer is smaller than that of the friction layer.

8. The brake pad of claim 1, wherein the back plate comprises a metallic portion, wherein an E modulus and/or a G modulus of the underlayer is smaller than that of the metallic portion of the back plate.

9. The brake pad of claim 1, wherein the underlayer has a portion that is arranged between the back plate and the friction layer, wherein the portion of the underlayer that is arranged between the back plate and the friction layer has a thickness of at least 1 mm and at most 4 mm.

10. The brake pad of claim 1, wherein the underlayer contains copper particles.

11. A disk brake system comprising the brake pad of claim 1.

12. The brake pad of claim 1, wherein the underlayer has an anisotropic E modulus and/or an anisotropic G modulus.

\* \* \* \* \*